(12) United States Patent
Schmitt et al.

(10) Patent No.: US 8,653,427 B2
(45) Date of Patent: Feb. 18, 2014

(54) DIGITAL SEMI-ACTIVE LASER RECEIVER TRACKING OF MULTIPLE LINE-OF-SIGHT (LOS) OBJECTS

(75) Inventors: William J. Schmitt, Tucson, AZ (US); Ronald O. White, Oro Valley, AZ (US); John T. Vong, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 236 days.

(21) Appl. No.: 13/329,272

(22) Filed: Dec. 17, 2011

(65) Prior Publication Data

US 2013/0153745 A1   Jun. 20, 2013

(51) Int. Cl.
   *G01C 21/02*   (2006.01)

(52) U.S. Cl.
   USPC .................................. 250/203.6; 250/206.1

(58) Field of Classification Search
   USPC ......... 250/203.1, 203.6, 206.1, 214 R, 214.1;
   356/3.16, 139.04–139.08; 342/42, 90,
   342/114, 195; 244/190
   See application file for complete search history.

(56) References Cited

U.S. PATENT DOCUMENTS 5,001,486 A * 3/1991 Bächtige .......................... 342/42

* cited by examiner

*Primary Examiner* — Que T Le
(74) *Attorney, Agent, or Firm* — Eric A. Gifford

(57) ABSTRACT

A digital SAL receiver implements a multiobject tracking method to detect EM pulses transmitted by a known source at a pulse repetition interval (PRI) and returned off of a target object to acquire multiple tracks. Intra and inter track temporal information is used to associate pulses with different tracks and to rank the tracks in order to designate a primary track for the target object.

20 Claims, 10 Drawing Sheets

$d^2 = \underline{y}^T \underline{\underline{S}}^{-1} \underline{y}$ $$d^2 = \begin{bmatrix} \Delta T \\ \Delta A \\ \Delta PW \end{bmatrix}^T \begin{bmatrix} \sigma^2_{\Delta T} & 0 & 0 \\ 0 & \sigma^2_{\Delta A} & 0 \\ 0 & 0 & \sigma^2_{\Delta PW} \end{bmatrix}^{-1} \begin{bmatrix} \Delta T \\ \Delta A \\ \Delta PW \end{bmatrix}$$

$$d^2 = \begin{bmatrix} \Delta T & \Delta A & \Delta PW \end{bmatrix} \begin{bmatrix} \frac{1}{\sigma^2_{\Delta T}} & 0 & 0 \\ 0 & \frac{1}{\sigma^2_{\Delta A}} & 0 \\ 0 & 0 & \frac{1}{\sigma^2_{\Delta PW}} \end{bmatrix} \begin{bmatrix} \Delta T \\ \Delta A \\ \Delta PW \end{bmatrix}$$

$$d^2 = \frac{\Delta T^2}{\sigma^2_{\Delta T}} + \frac{\Delta A^2}{\sigma^2_{\Delta A}} + \frac{\Delta PW^2}{\sigma^2_{\Delta PW}}$$

$$d^2 = k_{\Delta T} \cdot \frac{\Delta T^2}{R^2_{\Delta T}} + k_{\Delta A} \cdot \frac{\Delta A^2}{R^2_{\Delta A}} + k_{\Delta PW} \cdot \frac{\Delta PW^2}{R^2_{\Delta PW}}$$

DIGITAL SEMI-ACTIVE LASER RECEIVER TRACKING OF MULTIPLE LINE-OF-SIGHT (LOS) OBJECTS

BACKGROUND OF THE INVENTION

1. Field of the Invention

This invention relates to a digital semi-active laser receiver ("digital receiver") and more particularly to the acquisition and tracking of a laser designated pulse sequence reflected off of a target object.

2. Description of the Related Art

Certain aircraft, missiles and smart projectiles include a receiver that allows the platform to receive and process electromagnetic (EM) pulses, typically in the near IR, transmitted by a known source at a pulse repetition interval (PRI) and returned off of a target object. A typical source may generate an EM pulse that is a few nanoseconds wide with a PRI in the tens of milliseconds. The receiver may be fixed to look along the line-of-sight (LOS) of the platform or gimbaled to look along a receiver LOS relative to the platform LOS. If the source is remotely located the system is referred to as 'semi-active' whereas if the source is co-located on the platform with the receiver the system is referred to as 'active'.

A core capability required to support receiver functionality is to reliably and accurately detect the presence of EM pulses returned from a real target from amidst natural clutter, a second valid designation of a different target object and countermeasures such as active jamming and to acquire and maintain a "track" at or near the source PRI to measure the line-of-sight (LOS) from the platform to the target object. Errors in acquisition and maintenance of the "track" can cause mission failure.

In a mixed analog/digital architecture, a mixture of analog and digital circuitry is used to qualify, detect and correlate individual pulses to acquire and maintain a track at or near the source PRI. The pulse qualification and detection step occurs continuously as the pulse signal comes into a filtering circuit. Analog electronics set a detection threshold, fixed or time dependent, based on previous detection amplitudes. The sequence of filtered pulses is supplied to digital circuitry that, for example, implements an N of M pulse correlation (hereinafter referred to as "correlation") at the source PRI. Pulse selection logic (e.g. maximum amplitude pulse, last pulse logic (LPL)) is then applied to each PRI gate independently to select the pulse that best matches the rule based decision criteria. The sequence of correctly coded temporal pulses selected within each period forms the track. The receiver gain is optimized for the track. A LOS is computed for each pulse in the track. Guidance applies a filter to the track LOS values to remove occasional incorrect pulses.

As shown in FIG. 1, a digital receiver 50 includes a quad detector 52 that detects incident radiation (e.g. transmitted pulses reflected off a target or other objects, pulses transmitted to actively jam the receiver or other designated targets) and generates analog signals 53, a bank of pre-amps 54 that amplify the analog signals 53 and A/D converters 55 that convert analog signals 53 to digital signals 56 on individual channels A, B, C and D. The digital signals comprise a sequence of samples each having a sample or time index and amplitude. The samples may be referred to in context as "samples", "time samples" or "amplitude samples" depending on whether the relevant property is the time-index or the amplitude.

A digital processor 57 detects "pulses" from the samples, establishes a "track" from the pulses, calculates a LOS to a target object for each pulse and performs additional processing to generate a track report 58 that is passed on to a command and guidance processor 60 via digital bus 62 to guide the platform to the target object. The digital processor provides a gain to optimize performance for the track. This figure illustrates that all of the pulse detection, tracking and LOS processes, except for the front-end A/D conversion, is digital and may be implemented in a single processor 57 that includes memory. The all-digital architecture is smaller, lighter weight, less expensive, uses less power and is more reliable than the mixed analog/digital architecture.

For throughput reasons, the digital receiver detects, correlates and qualifies individual pulses to acquire and maintain a track at or near the source PRI. The digital receiver detects pulses using a noise-based threshold and then applies a comb filter to remove high frequency signals (e.g. noise signals). In an "Acquisition" mode, the digital receiver applies a correlation to the pulses output by the firmware and comb filter. Assuming a correlation is found to establish a track, the receiver may use order based pulse selection logic to increase the likelihood that the acquired track is the track for the target object and not clutter in front of or behind the target object or a false track generated by clutter or countermeasures. In a "Track" mode, the digital receiver uses the phase information of the pulses in the acquired track to establish a next PRI gate. The gates are typically a few to a few tens of microseconds wide and spaced at the PRI. The digital receiver applies a threshold, fixed or time dependent, to the pulses within the gate and then applies selection logic (e.g. maximum amplitude pulse, last pulse logic (LPL)) to the thresholded pulses to identify the candidate pulse and associate the pulse with the track. The processor calculates a gain optimized for the track. Once the digital receiver enters "Track" mode, the correlation is disabled.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method implemented by a digital receiver to detect EM pulses received at a pulse repetition interval (PRI) from a target object and other objects in the field-of-view (FOV) to acquire multiple tracks of different objects. Intra and inter track temporal information is used to associate pulses with different tracks and to rank the tracks in order to designate a primary track for the target object.

In various embodiments, in an "Acquisition" mode the digital receiver applies a correlation to the EM pulses to acquire a first track at or near the source PRI. In a "Post-Acquisition" mode, the digital receiver may acquire one or more secondary tracks in one PRI following acquisition of the first track. In a "Pre-Track" mode the receiver may use both inter and intra track temporal information to associate the EM pulses in a next PRI gate to different tracks. The digital receiver may use the intra track temporal information to generate a score for each track and use the inter track temporal information provided by the scores to rank the multiple tracks. The digital receiver maintains the current tracks while suitably attempting to acquire additional secondary tracks ("Continuous Acquisition" mode) on non-associated residual pulses. Upon entering "Track" mode, the digital receiver may designate the highest ranked track as a primary track or may pass the tracks to a guidance processor that returns a designation of the primary track for the final commit to the target object. The receiver adjusts a gain to optimize performance for the primary track. The digital receiver suitably maintains all the tracks to preserve the intra and inter track temporal information to associate pulses in subsequent PRI gates.

In an embodiment, in the "Post-Acquisition" mode the digital receiver tries to form additional tracks in one PRI following initiation of the first track for non-associated residual pulses. The digital receiver qualifies each track to accept or reject the track.

In an embodiment, in the "Continuous Acquisition" mode the digital receiver correlates each new pulse that is not associated with one of the existing tracks to acquire additional secondary tracks. For efficiency, each new unassociated pulse is suitably only correlated against previously unassociated pulses. Continuous Acquisition serves two functions. First, if the true target object was not acquired during Acquisition or Post-Acquisition it should be acquired. Second, if other false target objects appear, they can be tracked and used to improve pulse association and tracking ranking.

In an embodiment, in the "Pre-Track" mode the digital receiver processes the intra track temporal information to generate an estimated pulse for the next PRI gate for each track. The receiver associates the pulses in the next PRI gates to the different tracks based on a distance from the pulse to the estimated pulses. The distance may comprise one or more of a pulse timing, pulse amplitude, pulse shape or LOS. The receiver may associate each pulse as it is received within a gate to the track having the smallest distance. If a subsequent pulse within the current PRI gate replaces a preceding pulse within the same gate that preceding pulse may be re-associated with the next closest track.

In an embodiment, in the "Pre-Track" mode the digital receiver processes the intra track temporal information to generate a score for each track and uses the inter track temporal information provided by the scores to rank the multiple tracks. The score may comprise a match quality component that measures an average shape fit of the pulses in the track to a specified shape, a track persistence component that measure the persistence of the track, a track uncertainty component that measures an average uncertainty between the estimated pulse and the associated pulse. The score may also include inter track temporal information in the form of a pulse order component applied to the tracks. The pulse order component is determined by selection logic (e.g. first pulse logic (FPL), last pulse (LPL), maximum pulse logic (MPL)) that is applied to the estimated pulses for all of the tracks. The selection logic effectively ranks the pulses from the most likely to the least likely. The pulse order component is a distance of each pulse with respect to the most likely candidate pulse.

In an embodiment, in "Track" mode the digital receiver provides the tracks and their associated scores to the guidance processor, which in turn designates the primary track for final commit to the target object. The guidance processor may use additional system level information to augment the scores in order to designate the primary track.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a and 5b are a diagram and distance equation for associating an estimated pulse with a detected pulse;

DETAILED DESCRIPTION OF THE INVENTION

The present invention describes a method implemented by a digital receiver such as a digital receiver to detect EM pulses transmitted by a known source at a pulse repetition interval (PRI) and returned off of a target object and other objects in the FOV to acquire multiple tracks. Intra and inter track temporal information is used to associate pulses with different tracks and to rank the tracks in order to designate a primary track for the target object. Intra track temporal information is information provided by the time-history of pulses that constitute a given track. Inter track temporal information is information provided by relationships between tracks at a given time or PRI gate.

A digital receiver detects incident radiation consistent with EM pulses and applies a thresholding scheme to eliminate pulses that lie within the noise and applies a comb filter to eliminate sequences of pulses at frequencies that are outside the expected frequency range. The remaining pulses are stored in an acquisition buffer. Presumably the time-sequence of pulses that pass through the acquisition includes a track of pulses at the PRI that are associated with the source and reflected off of the target object. The pulses are typically a few nanoseconds wide with a PRI of tens of milliseconds. However, the pulses may also include reflections off of non-target objects (e.g. clutter) positioned either in front of or behind the target object that appears as tracks at the source PRI on non-target objects. The target may implement countermeasures designed to confuse the digital receiver so that the receiver cannot acquire or maintain track on the true target object. The comb filter may not filter out some non-target signals. Errors in acquisition and maintenance of the "track" can cause mission failure. Furthermore, it is possible that two different laser designators may validly designate two separate targets both within the field of view of the digital receiver.

Figure 1:
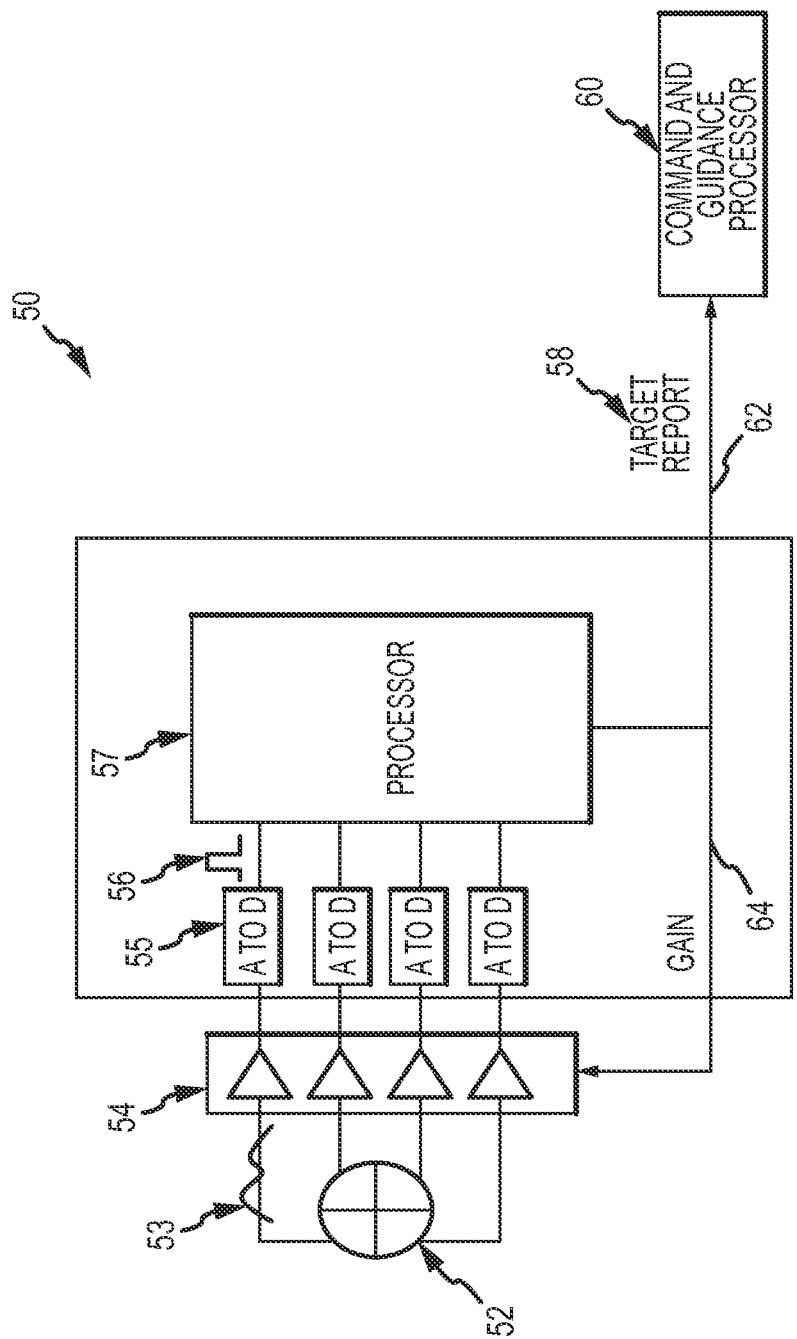
FIG. 1, as described above, is a block diagram of a digital receiver.
Figure 2:
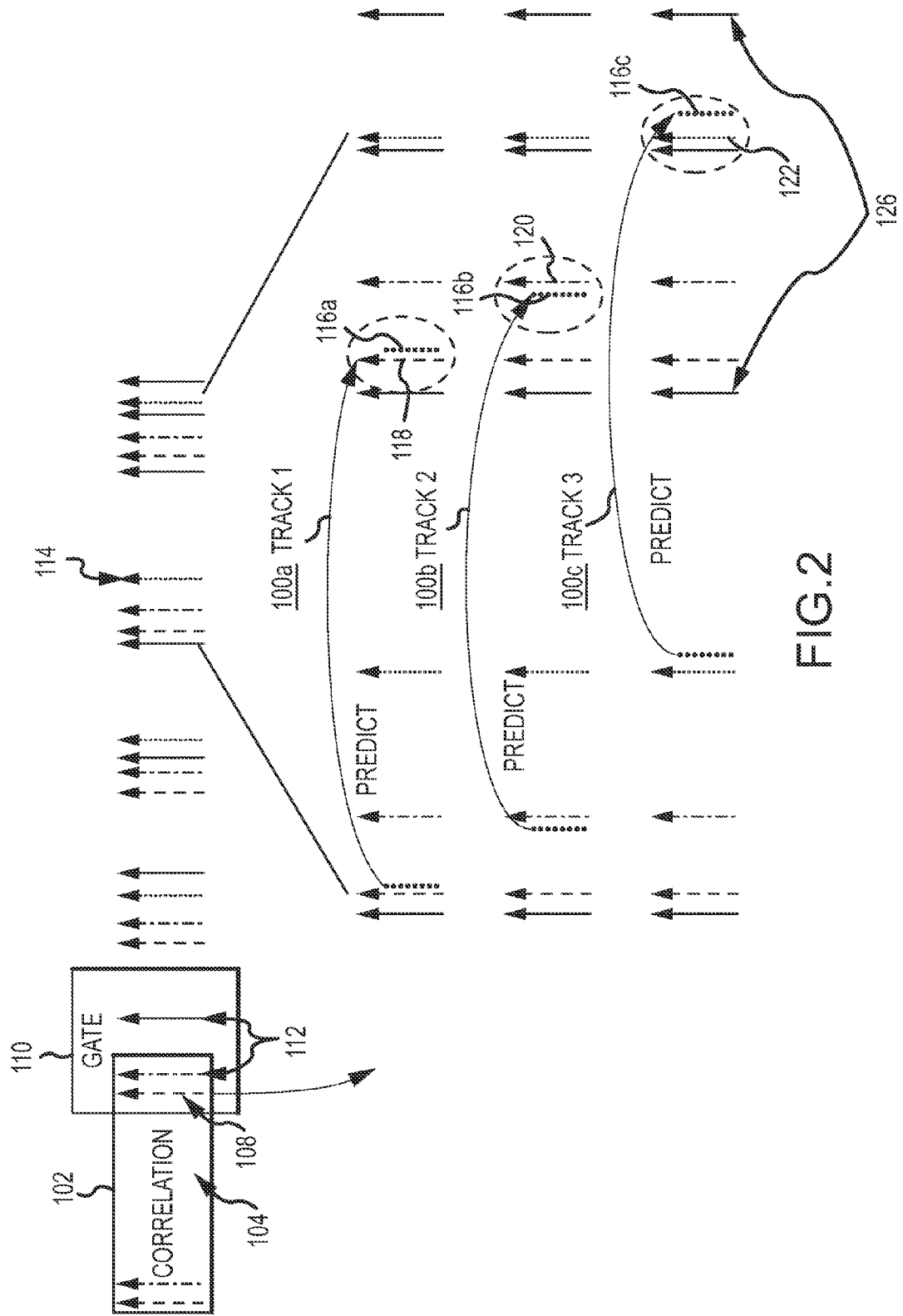
FIG. 2 is a diagram illustrating tracking of multiple LOS objects in accordance with the present invention.

As shown in FIG. 2, in an embodiment to acquire and maintain a track on the target object the digital receiver acquires and maintains multiple tracks 100a, 100b and 100c on various real and possibly false objects.

In "Acquisition" mode, the receiver attempts to establish a first track 100a on an object by applying a correlation 102 at the PRI to a sequence of pulses 104 in the acquisition buffer over multiple PRI. The receiver may be provided with the laser designator PRI or may sweep a range of frequencies to identify the PRI. If the correlation finds a suitable match it initiates a track at a first pulse 108. The receiver does qualify the track by, for example, comparing the pulse width of first pulse 108 to the known pulse width of the laser designator. If the pulse is disqualified, Acquisition continues until a qualified track is initiated.

Once a first track 100a is acquired and qualified, the receiver initiates a "Post-Acquisition" mode in which the receiver tries to form additional tracks on any non-associated residual pulses in one PRI following initiation of the first track. The receiver places a gate 110 behind first pulse 108 and initiates a track 100b for each residual pulse 112 within the gate. In this example, the first residual pulse 112 produces a correlation track. The digital receiver qualifies each track to accept or reject the track. The receiver also executes a "Continuous Acquisition" mode in which any pulse 114 that is not associated with an existing track and produces a correlation at the PRI initiates a new track 100c.

The digital receiver initiates a "Pre-Track" mode in which newly received pulses are associated to the different tracks and the tracks are scored and ranked with the highest ranked track being the track most likely associated with the target object.

The receiver processes the intra track temporal information to generate an estimated pulse 116a, 116b and 116c for the next PRI gate for each said track 100a, 100b and 100c. The estimate may include one or more of the timing of the pulse within the next PRI gate (as depicted in FIG. 2), pulse amplitude, pulse shape (e.g. width) or pulse LOS. The next PRI gate is typically a few to a few tens of microseconds wide and is centered at the next PRI interval of tens of milliseconds. These gates may or may not overlap. The overlapping may change with the relative phase properties of the tracks or with changing width of the PRI gate.

The receiver computes a "distance" metric from each newly received pulse 118, 120, 122 to the various estimated pulses within the one or more gates that contain pulse and, for example, associates the received pulse with the track having the smallest distance. The various components of the estimate and distance (e.g. timing, amplitude, shape and/or LOS) may be weighted based on their demonstrated ability to correctly associate pulses. If a subsequent pulse within the same PRI gate provides a better match (e.g. smaller distance), the receiver may associate that pulse with the track and reassign the preceding pulse to another track. The receiver may associate pulses on a local pulse-by-pulse basis or may associate the pulses to the tracks on a global basis to minimize an overall distance. Various pulses are not associated with any existing track and thus form residual pulses 126 that are consider by the Continuous Acquisition to acquire additional tracks. In this example, none of the residual pulses 126 as of yet forms a new track.

The receiver updates a score for each track and ranks the tracks based on their score. The score may be based on intra and/or inter track temporal information. The score may comprise a match quality component that measures an average shape fit of the pulses in the track to a specified shape, a track persistence component that measure the persistence of the track, a track uncertainty component that measures an average uncertainty between the estimated pulse and the associated pulse and a pulse order component. The pulse order component is determined by selection logic (e.g. first pulse logic (FPL), last pulse (LPL), maximum pulse logic (MPL)) that is applied to the estimated pulses for all of the tracks. The selection logic effectively ranks the pulses from the most likely to the least likely. The pulse order component is a distance of each pulse with respect to the most likely candidate.

The digital receiver initiates a "Track" mode upon final commit to the target object. The receiver designates one of the tracks as a primary track for tracking the target object and adjusts receiver gain based on the primary track. Absent other information or direction, the receiver will designate the highest ranked track as the primary track. Alternately, the tracks may be passed to the guidance processor, which in turn designates the primary track for final commit to the target object. The guidance processor may use additional system level information to augment the scores in order to designate the primary track. The receiver suitably maintains all of the other tracks. This improves association of pulses to the primary track during the final phase to target.

A comparison illustrates the differences between the standard single-track approach and the proposed multi-track approach. Both approaches use the same correlation to acquire a first track. The conventional approach applies a pulse order based selection logic to potentially shift the track to another sequence of pulses that is considered more likely to be the true target object. This decision is critical and made based on the relation of the pulses within a single PRI gate, and possibly a couple preceding gates based on the correlation. There are no assurances that pulses for the true target object are even considered. The multi-track approach does not apply selection logic to the first track. Because the receiver acquires tracks for each of the other pulses in the PRI gate following initiation of the first track and continues to acquire tracks for non-associated pulses throughout Pre-Track it does not matter whether the first track corresponds to the true target object or not. In Track mode, the conventional approach uses selection logic e.g. Maximum Pulse Amplitude, or LPL to associate a pulse in the next PRI gate with the track. The receiver optimizes the gain for the track once acquired. The multi-track approach uses a Pre-Track mode in which multiple pulses in PRI gates are assigned to different tracks based on distances to estimated pulses for each track. Selection logic is not used to associate pulses. The tracks are then scored and ranked. Upon commit to the target object, the multi-track approach enters "Track" mode at which time one of the tracks, possibly the highest ranked, is designated as the primary track. At this point, the gain is optimized for the primary track.

Figure 3A:
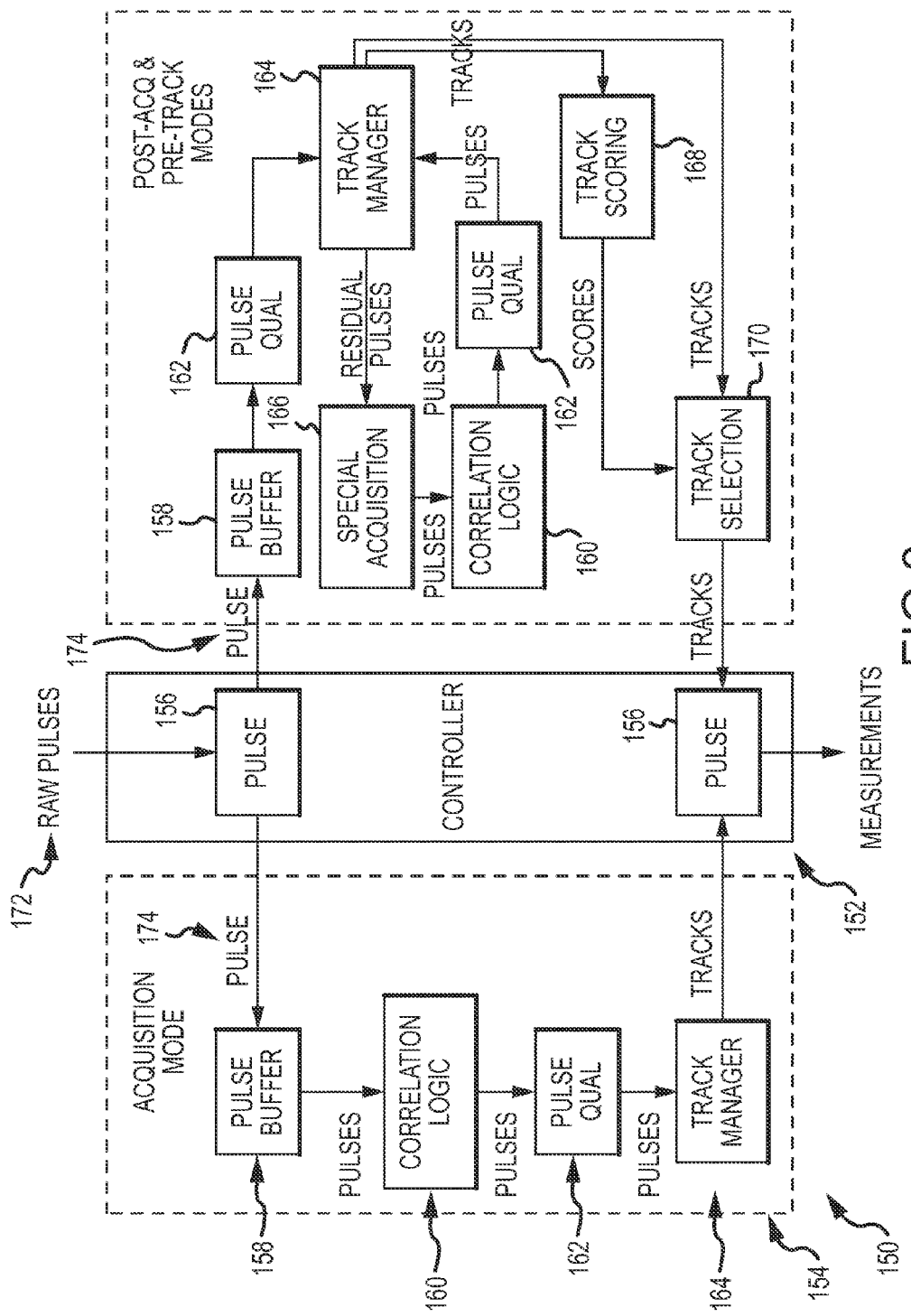
FIGS. 3a and 3b are a functional block diagram and an internal state diagram of an embodiment of a digital receiver for tracking multiple LOS objects.
Figure 3B:
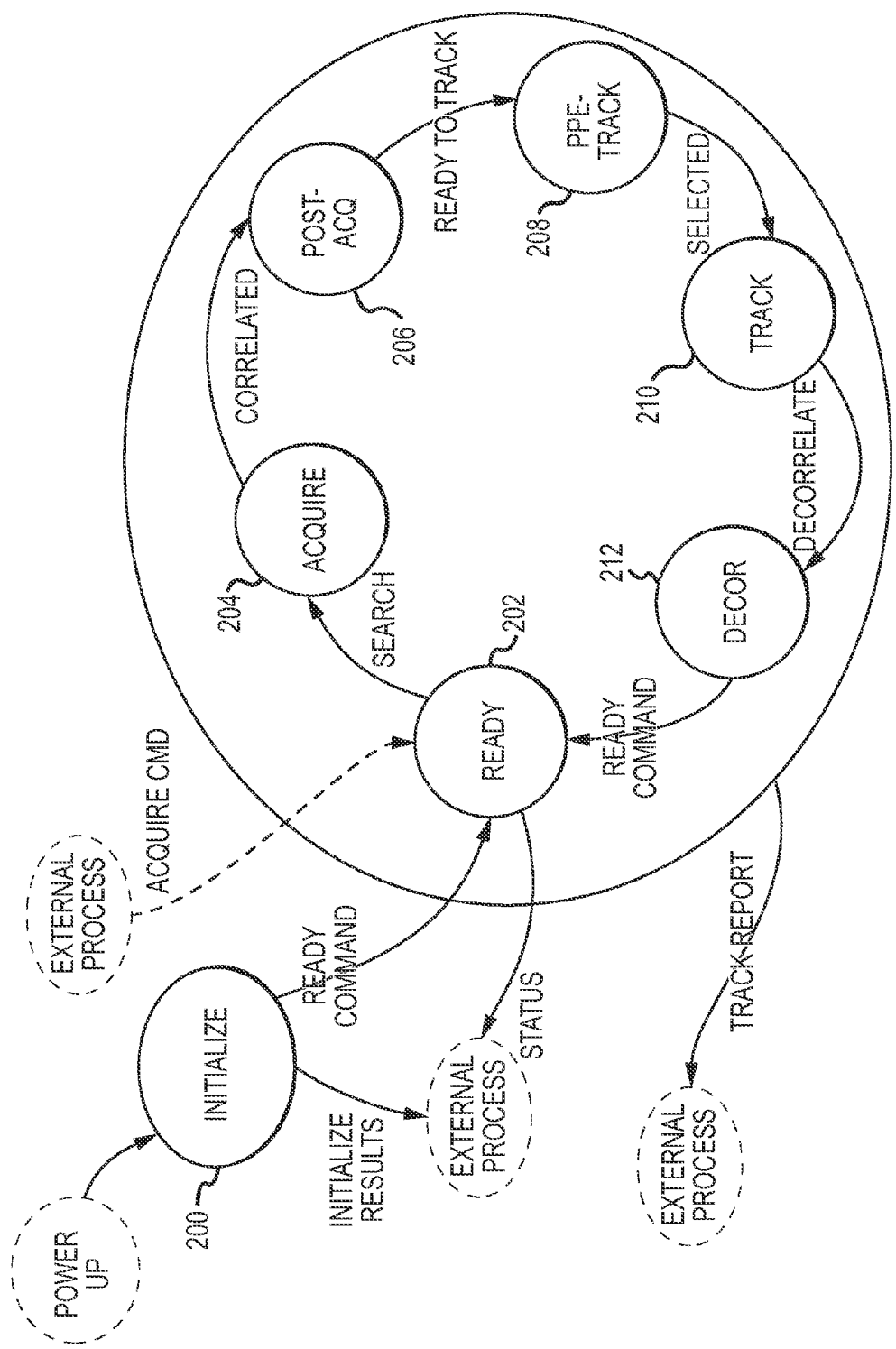

An embodiment of a digital receiver 150 configured to implement the tracking of multiple LOS objects in accordance with the present invention is illustrated in a functional block and internal state diagrams of FIGS. 3a and 3b.

As shown in FIG. 3a, the receiver is configured to implement a controller 152 and a multiple object tracker 154 in a master-slave relationship. Controller 152 is responsible for communication with external processes such as Guidance and for monitoring the state of the tracker and controlling the track process sequencing. The multiple object tracker is responsible for executing the "Acquisition", "Post-Acquisition", "Continuous Acquisition", "Pre-Track" and "Track" modes to acquire and track multiple objects and eventually designate and output a track for the target object.

As shown there are two distinct phases to the multiple object tracker 154 that are depicted in this functional representation. The first phase is the "Acquisition Mode" for acquiring the first tracked object. The second phase is the "Post-Acquisition" and "Pre-Track" modes for tracking existing tracks plus the acquisition of new tracks. In Track mode, the tracker commits to one target track while optionally maintaining other tracks. The tracker executes certain modules in both phases; pulse 156, pulse buffer 158, correlation logic 160, pulse qualification 162 and track manager 164. The tracker also executes special acquisition 166, track scoring 168, and track selection 170 in the second phase. Raw Pulse 172 detection data is processed by the Controller 152 to form an initial Pulse 156. Pulse 156 stores and computes all pulse measurable quantities (e.g. Time of Arrival, LOS Angle). Pulse 156 computes the compensated amplitudes and LOS angle measurement and stores a pointer to the Raw Pulse 172, which together form a Pulse 174. Pulse Buffer 158 stores an array of Pulses 174. The Pulse Buffer 158 optimizes memory usage and minimizes copy operations. Correlation logic 160 produces candidate correlations based upon the Time of Arrival of the pulses. Pulse Qualification 162 filters potential pulses based upon pulse shape and/or amplitude. Pulse Qualification uses the Raw Pulse 172 to extract measurable quantities from the pulse samples (e.g. Pulse Amplitude, Pulse Width). Pulse Qualification 162 may also split a Raw Pulse 172 into multiple Pulses 174 in the event of closely spaced pulses. Qualification of pulses is one embodiment for accepting or rejecting candidate tracks. Track Manager 164 stores and updates tracks by associating new pulses to the different tracks for different objects and providing the link from the pulse to the track. The track contains all state information known about the object. Special Acquisition 166 performs secondary object acquisition following the initiation of the first track including both post-acquisition and continuous acquisition. Primary acquisition logic may or may not be reused. Special Acquisition 166 provides flexibility to incorporate additional information available from existing tracks into the acquisition process and tailor the process to a particular embodiment of the invention. Track Scoring 168 computes the track score of each track. This module may be incorporated as part of Track Manager 164. Track Selection 170 ranks the tracks based on their relative scores and upon entering "Track" mode designates the primary track. This module may also be incorporated as part of Track Manager 164.

In Acquisition Mode, tracker 154 stores Pulses 174 in Pulse Buffer 158. Correlation Logic 160 produces a candidate correlation based on the time of arrival data for a sub-sequence of pulses. Pulse Qualification 162 filters the pulses in the candidate correlation based upon pulse shape (e.g. pulse width) and/or amplitude to accept or reject the candidate correlation. If rejected, the next candidate correlation is forwarded to Pulse Qualification 162. Once accepted, the candidate correlation becomes the first track. Track Manager 164 stores the track including links to each of the pulses that constitute the track. Acquisition Mode ends once the first track is acquired.

In Post-Acquisition and Pre-Track modes, tracker 154 stores new Pulses 174 in Pulse Buffer 158. The Track Manager 164 filters pulses using first the track gates and then Pulse Qualification 162 to filter out pulses that are obviously not associated with an existing track. Track Manager 164 associates the remaining pulses with the existing tracks and updates the track scores and rank. The Track Manager forwards any non-associated "residual" pulses to Special Acquisition 166 to acquire additional tracks. Correlation Logic 160 may or may not produce a candidate correlation based on the time of arrival data for a sub-sequence of pulses including the current and former residual pulses. Pulse Qualification 162 filters the pulses in the candidate correlation to accept or reject the new track. To save throughput, Pulse Qualification may rely upon previous qualification results when available. The Track Manager forwards the tracks to Track Scoring 168 and Track Selection 170 to update the track scores and to rank the tracks. The tracker repeats the process as long as pulses are available in the buffer and until a final commit decision is made on the target object. At this point, Track Selection 170 designates a track as the primary track based either in part or entirely on the track rankings. The digital receiver optimizes the receiver gain for the primary track. The Tracker suitably maintains all of the tracks but may delete all but the primary track.

An embodiment of an internal state diagram for the multi-object tracker is depicted in FIG. 3b. The Tracker includes the following states: Initialize 200 initializes tracker and hardware, identifies a system and provides a "safe" mode that prevents the tracker from doing anything that might damage hardware or disrupt communications; Ready 202 indicating whether the Tracker is ready to receive commands; Acquire 204 indicating whether the Tracker is attempting to establish the first object track; Post-Acquisition 206 indicating whether Tracker is within one PRI following track initiation to form secondary tracks if other objects present; Pre-Track 208 maintains current tracks while attempting to acquire secondary tracks; Track 210 commits to either primary track or externally selected track and optimizes gain for designated track; and Decorrelate 212 indicates if the Designated Track has decorrelated and whether to wait for external instructions or automatically transition to Acquire 204. The Tracker is further characterized by a Tracker Status message field: No Pulses—No pulses detected since last status message; Pulses Present—Pulses detected since last status message, but no correlation yet; Correlated—Pulse sequence correlated, but insufficient conditions to change to track mode; Ready for Track—Sequence correlated and sufficient conditions to track object exist; Selected—Target selected and in track; and Decorrelate—Selected target no longer in track. The Tracker receivers Tracker Commands including: Ready—Ready system for operation' Configure—Process laser code and configure system; Search—Perform target acquisition logic; and Track—Track the selected target ID.

Figure 4:
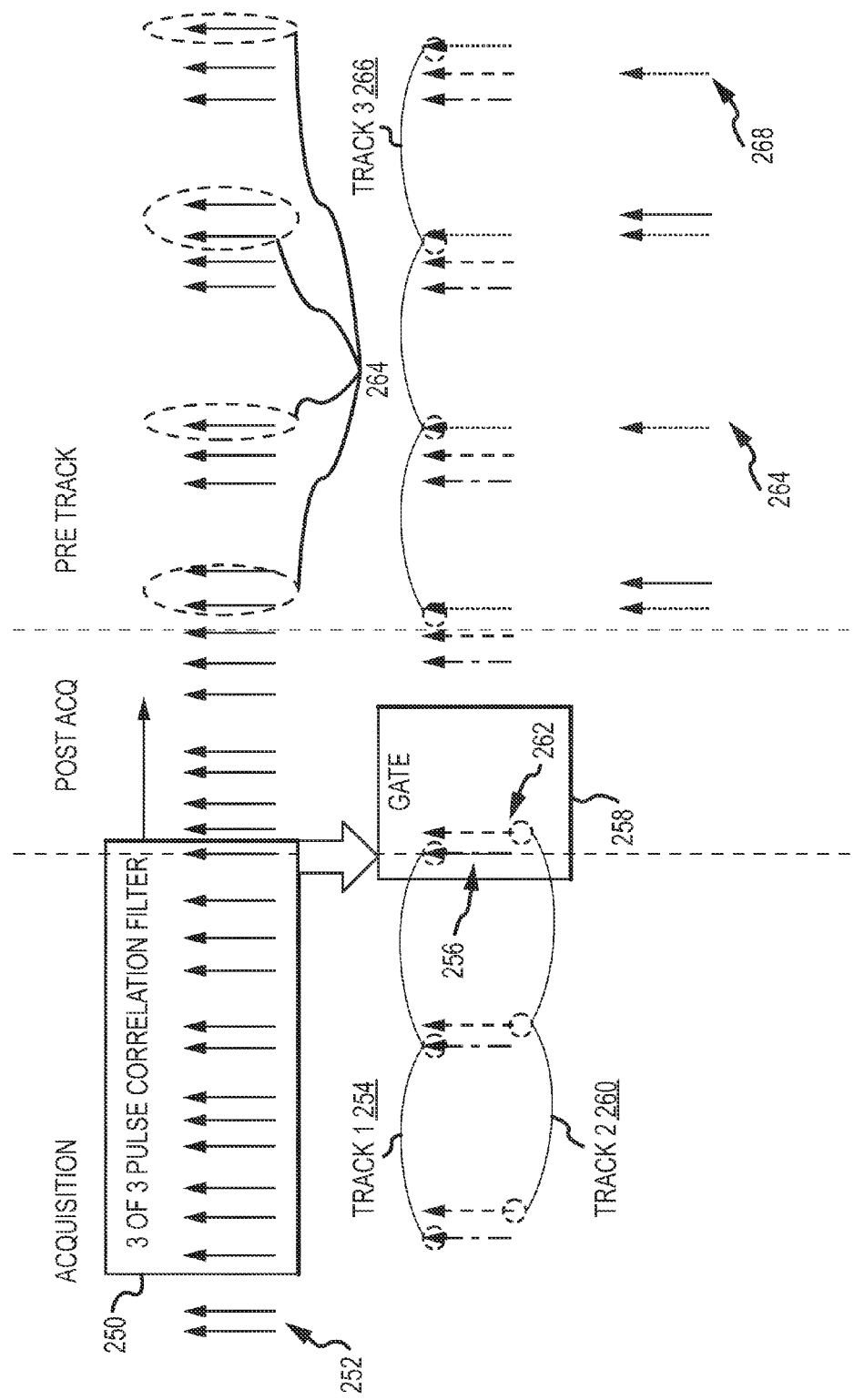
FIG. 4 is a diagram illustrating the "Acquisition", "Post-Acquisition" and "Continuous Acquisition" modes for acquiring tracks for multiple LOS objects.

An embodiment of the Acquisition, Post-Acquisition and Continuous Acquisition Modes is depicted in FIG. 4. In Acquisition mode, an "N of M" correlation filter 250 at the source PRI shown here as a "3 of 3" reverse postulate correlation filter that spans 2 PRI is applied to the pulse data 252 in the acquisition buffer. In this example, the correlation filter produces two sub-sequences of pulses that provide candidate correlations. The first candidate correlation is qualified and declared to be a first track 254 at a pulse 256. The tracker moves to "Pre-Acquisition" mode in which the special acquisition logic places a gate 258 behind pulse 256 and deletes pulse 256 and the other pulses associated with first track 254 from the acquisition buffer. The correlation logic identifies a candidate correlation that is qualified and declared to be a second track 260 at pulse 262. The selection acquisition logic would repeat this process for any other pulses in gate 258 until the acquisition buffer is empty. The Tracker moves to "Pre-Track" mode in which the Tracker generates an estimated pulse for each existing track and associates pulses in the buffer that lie within each track's next PRI gate to different tracks. The Tracker forwards any non-associated residual pulses 264 to the special acquisition logic to acquire additional tracks. In this example, after 3 PRI the Tracker acquires a third track 266 on the fourth residual pulse 268.

Figure 5A:
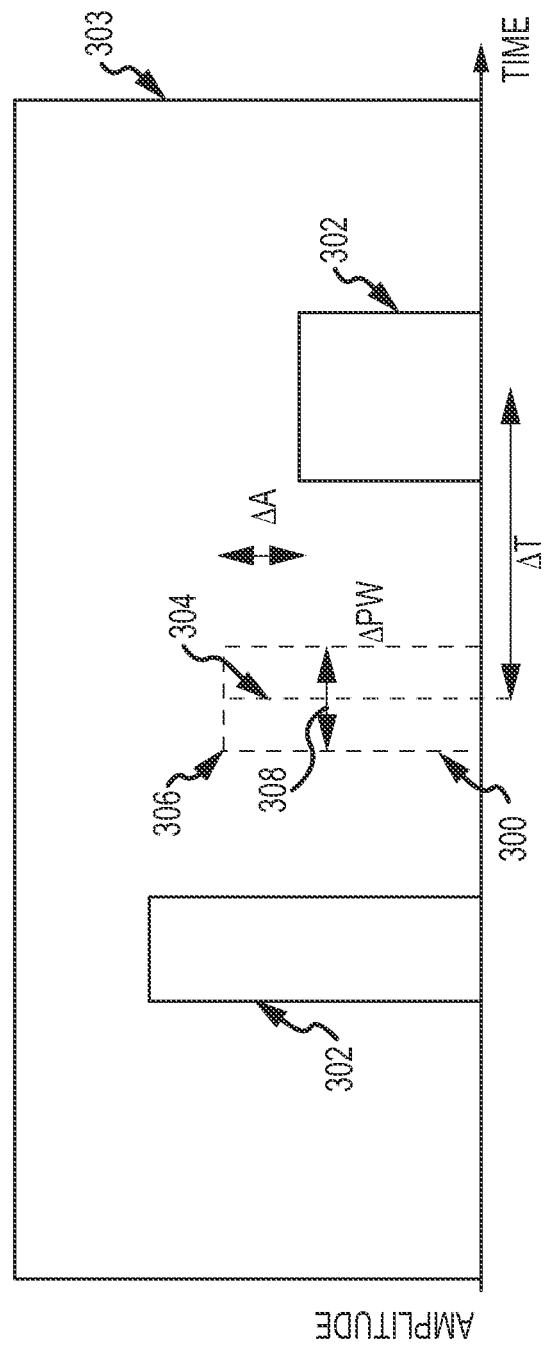

An embodiment of the process implemented by the Tracker for generating an estimated pulse 300 for a track and associating one of received pulses 302 and 303 with the estimated pulse and track is depicted in FIGS. 5a and 5b. The Tracker uses the intra track temporal information (e.g. time history of pulses in the track) to generate estimated pulse 300 for the next PRI gate 303. In an exemplary embodiment, the Tracker uses an alpha or alpha-beta filter, which is a Kalman filter with static gain in which the $1^{st}$ or "alpha" state variable is time and the $2^{nd}$ or "beta" state variable is PRI. The Tracker may use an alpha-beta filter to estimate the timing 304, an alpha-beta filter to estimate the amplitude 306 and an alpha filter to estimate the shape 308 (e.g. width). The Tracker may also use the time-history of the LOS track to filter large LOS changes and perform target breaklock detection.

To associate one of pulses 302 and 303 to estimated pulse 300, the Tracker computes a "distance" between each of the pulses and the estimated pulse. In an exemplary embodiment, the "distance" is the Mahalanobis Distance 310 illustrated in FIG. 5b. In this example, the Mahalanobis Distance is computed for differences in time ($\Delta T$), amplitude ($\Delta A$) and pulse width ($\Delta PW$) between each pulse and the estimated pulse. Each component is weighted by its variance "$\sigma^2$", which can be expressed by a residual noise estimate "$R^2$" and a weighting factor "k" that weights the relative reliability of the components. In an embodiment, "k" includes the expected relative covariance of the components factoring in a priori knowledge of the most likely relationship between the components. The "$R^2$" term adjusts for in flight deviations from the expectations. In one embodiment, the Tracker associates each new pulse as it is received. The Tracker determines which of the next PRI gates span the new pulse, computes the Mahalanobis Distance to the estimated pulse for each of those tracks and associates the pulse with the track corresponding to the smallest distance. Should a subsequent pulse within the same PRI gate produce a smaller distance to the same track, the Tracker associates that pulse with the track and may associate the preceding pulse to a different track. Alternately, the Tracker may process all of the pulses within the next PRI gates for all of the tracks and associates tracks to minimize a global distance.

Figure 6A:
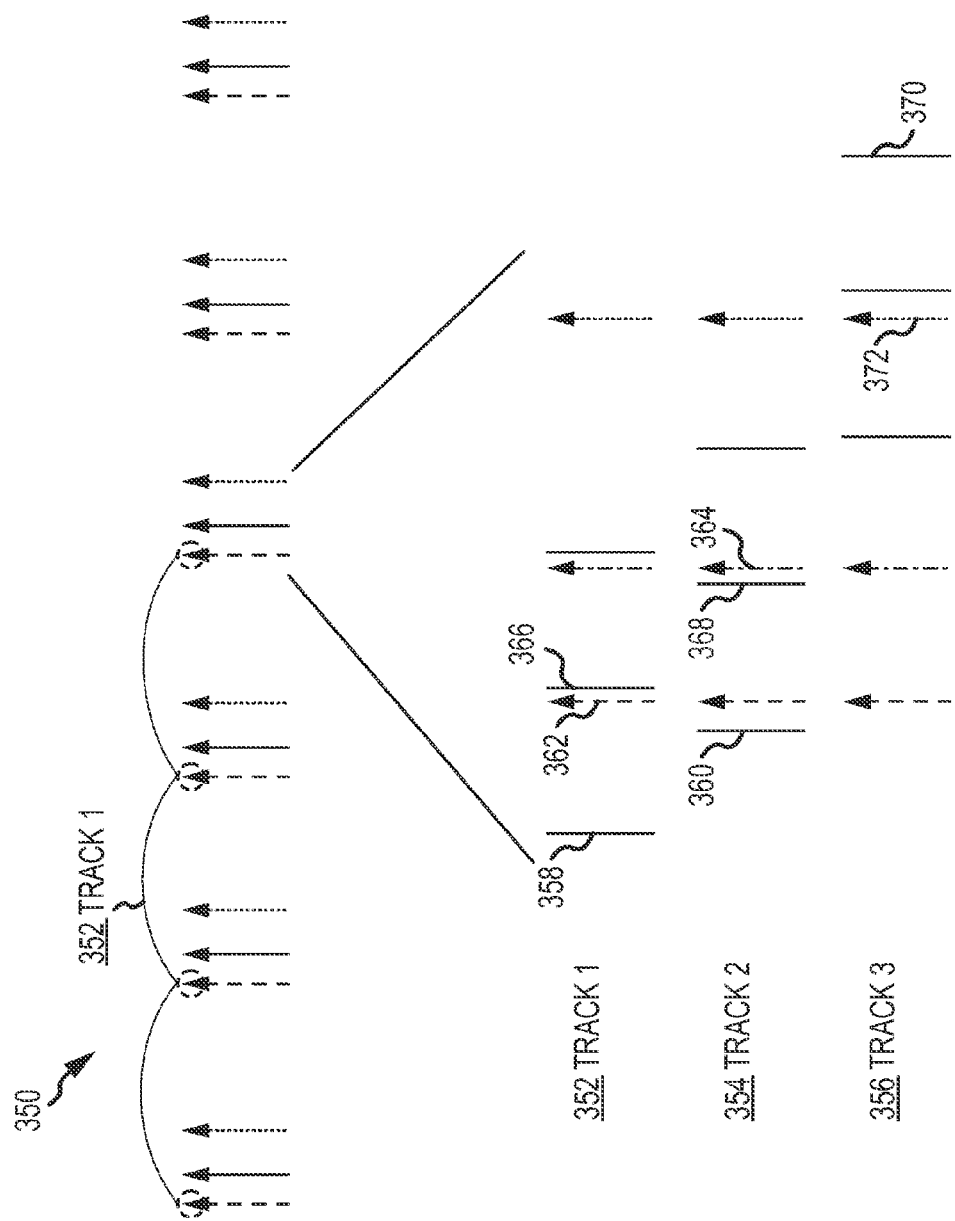
FIGS. 6a and 6b are diagrams illustrating embodiments for associating pulses with the different tracks in a "Pre-Track" mode.

An exemplary case in which the PRI gates and received pulses for a pair of tracks overlap creating an ambiguity that is resolved through the "association" is illustrated in FIG. 6a.

For clarity, pulse sequence 350 that includes three tracks 352, 354 and 356 does not include any non-associated pulses to the existing tracks and does include any incoming pulses that will not be associated to the existing tracks. As shown the next PRI gates 358 and 360 for Tracks 1 and 2, respectively, overlap and incoming pulses 362 and 364 lie within both gates creating an ambiguity for pulse association. Considering only the timing component, the Tracker generates estimated pulses 366 and 368 for Tracks 1 and 2 (e.g. the centers of their respective gates). The Mahalanobis Distance from pulse 362 to estimated pulse 366 is small and the Tracker associates pulse 362 with Track 1. Similarly, the Mahalanobis Distance from pulse 364 to estimated pulse 368 is small and the Tracker associates pulse 364 with Track 2. As shown, the gate 370 for Track 3 does not overlap any of the other gates and contains only pulse 372 so there is no ambiguity. In general, the gates may also include other pulses that are not associated to any of the existing gates. These pulses become the "residual" pulses that are then correlated against earlier residual pulses in, for example, the previous 3 PRIs, to acquire additional tracks.

Figure 6B:
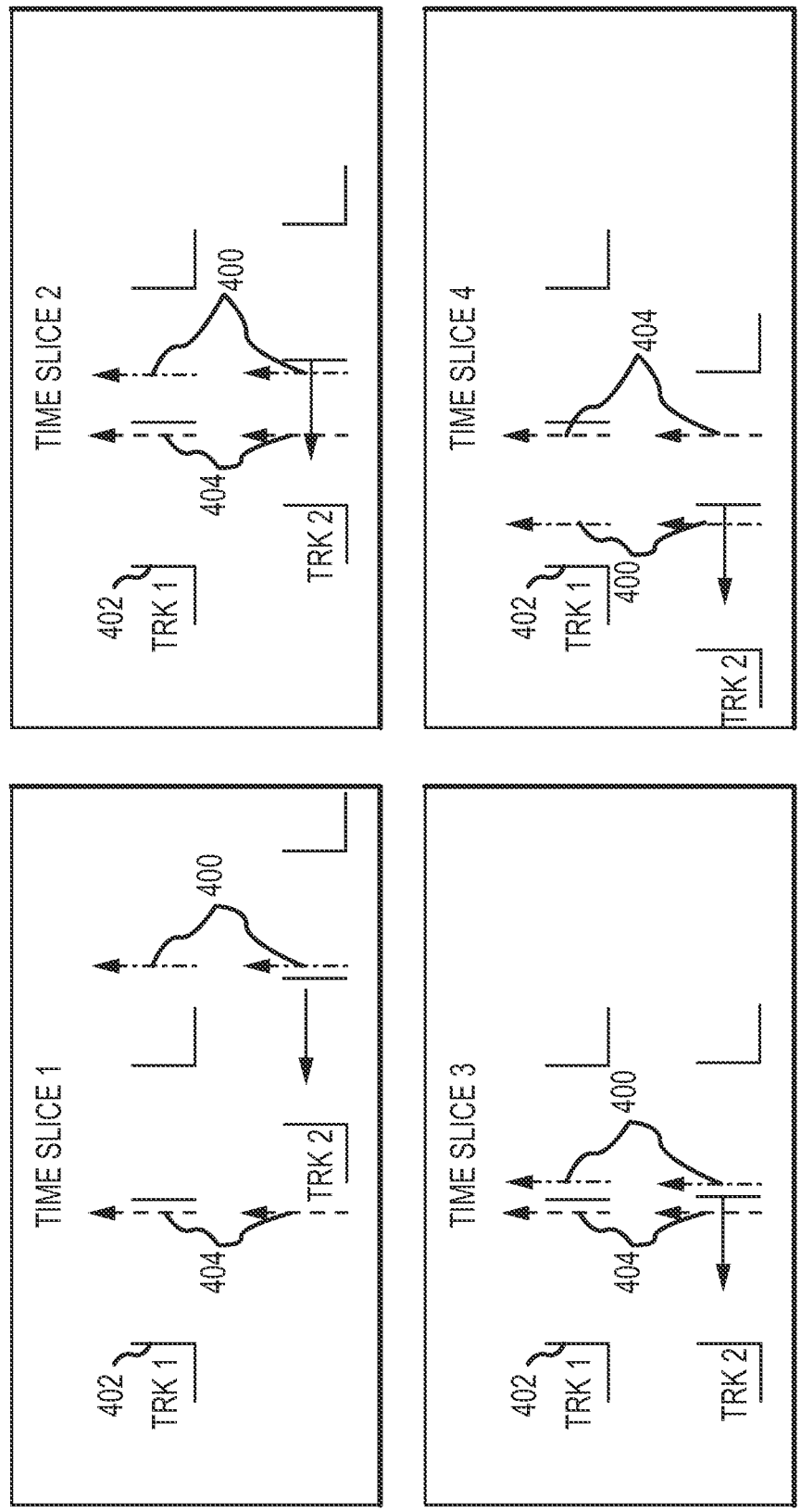

An exemplary case in which a non-target pulse 400 walks through a track's PRI gate 402 over time, e.g. time slices 1, 2, 3 and 4, to create an ambiguity with a true target object pulse 404 that is resolved through the "association" is illustrated in FIG. 6b. The non-target pulse sequence 400 only needs to have a small PRI difference from the target sequence to create the change in phase from frame to frame. In a conventional digital receiver in which only a single track is maintained, if the receiver selects the non-target pulse, effectively switching from Track 1 to Track 2, the non-target sequence can slowly walk the receiver away from the true object track, which eventually results in either a broken track or a commit to a false target object.

By comparison, the multiobject Tracker, which does not use selection logic to associate pulses, but rather uses estimated pulses based on a time history and a distance metric is far more robust. First, because the Tracker maintains multiple tracks and computes a distance that is typically based on multiple components (e.g. timing, amplitude, pulse width and LOS) as the non-target pulse 400 walks past the true target object pulse 404 the Tracker is less likely to associate the non-target pulse to the true object track. Second, even if the Tracker does associate the non-target pulse to the true object track for a given gate, the prediction of the estimated pulses based on the time-history of the track will inhibit the track from locking onto the non-target pulses and walking away.

Figure 7:
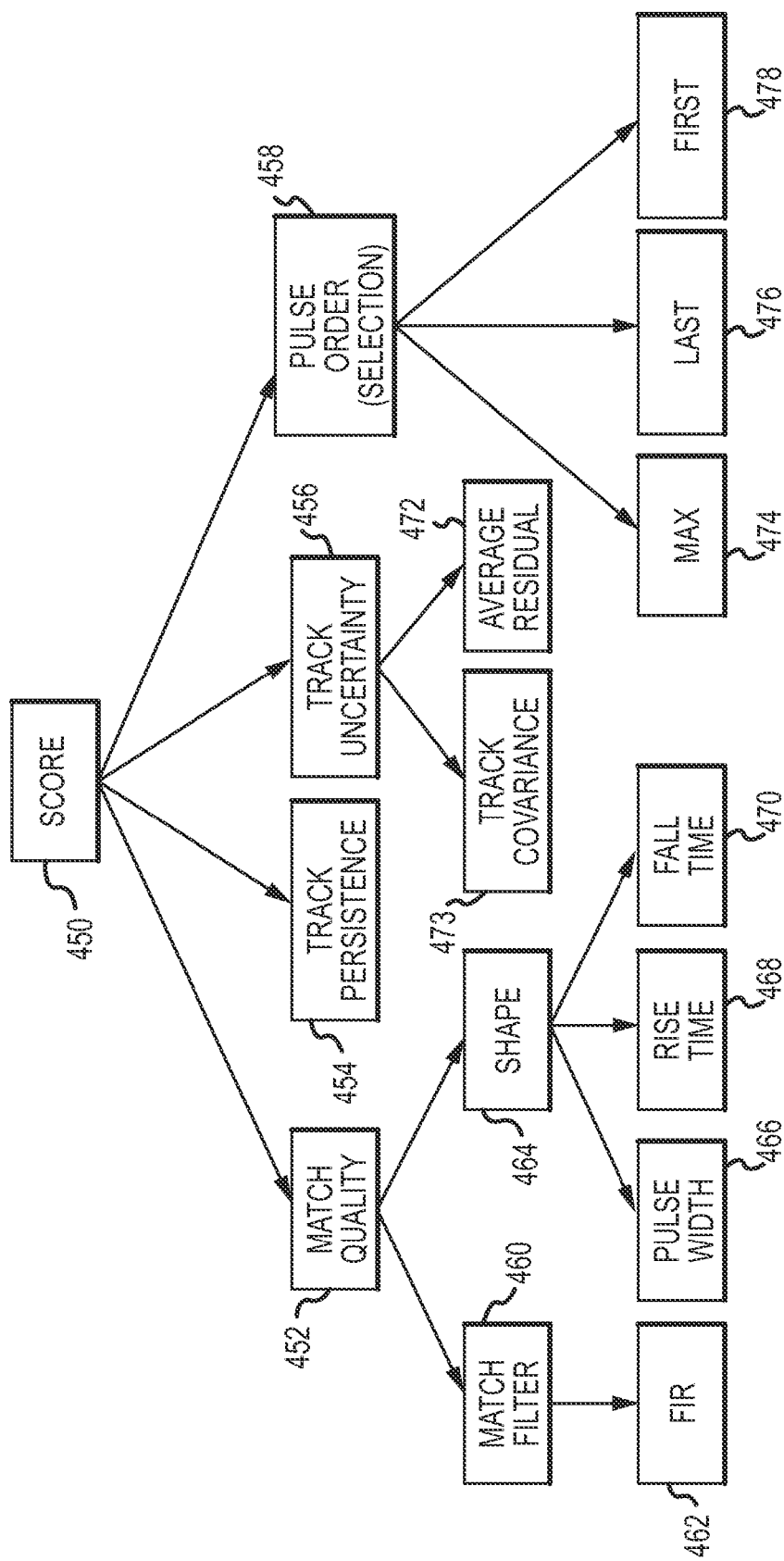
FIG. 7 is tree diagram illustrating embodiments for scoring the different tracks in the "Pre-Track" mode.

Various embodiments for constructing a track score 450 are illustrated in FIG. 7. The Tracker constructs track score 450 based on intra track temporal information such as match quality 452, track persistence 454 or track uncertainty 456 and possible inter track temporal information such as pulse order 458. Track score 450 is a normalized and weighted combination of one or more of these components scores.

Match quality 452 is a time-averaged measure of the "match" between the pulses associated with the track to an expected pulse shape for the laser designator. The time averaging may be uniform or weighted towards more recent pulses. The better the match the better the score. Match quality may be computed using a Match Filter 460 such as a Finite Impulse Response (FIR) filter 462. Alternately, match quality may be computed by measuring pulse shape 464 through shape parameters such as pulse width 466, rise time 468, or fall time 470.

Track persistence 454 is a measure of duration and consistency. In general, the track for the true target object is visible upon initial acquisition or within a few PRI. Non-target object tracks often appear later, and then intermittently. Thus, the track for the target object should exhibit a persistence that is longer in duration and more consistent. Track persistence f(t) may be computer of the form $f(t)=1-\exp(-t/\tau)$. As the track duration "t" increases the persistence approaches unity. The track persistence may be measured relative to the oldest track.

Track uncertainty 456 is a time-averaged measure of the uncertainty between the estimated pulse and the associated pulse. Consistent pulse/track association reduces track uncertainty. Poor feature matching (e.g. timing, amplitude, shape or LOS) increases uncertainty. Track uncertainty 456 may be computed as a time-averaged residual 472 between the estimated pulse and the associated pulse. The residual may be the Mahalanobis Distance computed for each associated pulse. The time averaging may be uniform or weighted towards more recent pulses. Alternately, track uncertainty 456 may be computed as a Track Covariance 473, which is the current process uncertainty in the target state estimate. Computation of the Track Covariance 473 requires a priori knowledge of the time evolution of the process and knowledge of the measurement uncertainty.

Pulse order 458 is a measure based on selection logic (e.g. last pulse logic, first pulse logic) applied to the estimated pulses for the tracks based on additional system-level or "conops" knowledge. This conops knowledge may indicate that the pulse reflected from the true target object is most likely to be the one with the maximum amplitude, the first pulse in the PRI gate or the last pulse in the PRI gate. Different maximum selection logic 474, last selection logic 476 or first selection logic 478 can be applied to the estimated pulses to declare the most likely target pulse. The tracker ranks the pulses from the most likely to the least likely on the selection logic and then computes a score based on this ranking. The score may be a distance of each pulse from the most likely. The score could be based on amplitude in the case of maximum amplitude selection or on timing in the case of first or last pulse selection logic. This selection logic is very similar to that used by conventional single-track digital receiver to associate pulses to the track. The multiobject tracker uses selection logic as a component to score the tracks, not to associate pulses. The use of selection logic also allows the multiobject tracker to maintain legacy algorithm compatibility while retaining improved discrimination performance of the multiobject tracker.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of tracking multiple line-of-sight (LOS) objects in the field-of-view (FOV) of a digital semi-active laser receiver to track a target object illuminated by a laser designator at a pulse repetition interval (PRI), said digital receiver executing the steps of:
   receiving a temporal sequence of laser pulses reflected off objects in the FOV at a high gain for the digital receiver;
   processing the laser pulses to acquire multiple tracks;
   using inter and intra track temporal information to associate pulses in a next PRI gate to different tracks; and
   designating one said track as a primary track for tracking the target object and adjusting receiver gain based on said primary track.

2. The method of claim 1, wherein the digital receiver correlates sub-sequences of the laser pulses to a PRI to acquire the tracks at or near the PRI.

3. The method of claim 2, wherein the digital receiver acquires a first track at a first pulse, said digital receiver correlating sub-sequences of the laser pulses for each non-associated laser pulse within one PRI gate of the acquisition of the first track to acquire additional tracks.

4. The method of claim 3, the digital receiver qualifies each track to accept or reject the track.

5. The method of claim 3, wherein subsequent to the placement of the post-acquisition gate and correlation of pulses within the gate, the digital receiver correlates sub-sequences of residual pulses that are not associated with one of the existing tracks to further acquire additional tracks.

6. The method of claim 1, wherein the digital receiver processes the intra track temporal information to generate an estimated pulse for the next PRI gate for each said track, said digital receiver associating the pulses in the next PRI gates to the different tracks based on a distance from the pulse to the estimated pulses.

7. The method of claim 6, wherein said distance is comprised of a pulse timing and at least one of a pulse amplitude, a pulse shape and a LOS associated with the pulse.

8. The method of claim 7, wherein said distance is comprised of at least said one of said pulse timing, said pulse amplitude and said pulse shape.

9. The method of claim 6, wherein as each pulse is received the digital receiver associates the pulse to the track having the smallest distance provided the pulse lies within the next PRI gate for that track.

10. The method of claim 6, wherein the digital receiver uses the intra track temporal information to generate a score for each said track and uses the inter track temporal information provided by the scores to rank the multiple tracks.

11. The method of claim 10, wherein said score comprises a match quality component that measures an average shape fit of the pulses in the track to a specified shape, a track persistence component that measures the persistence of the track and a track uncertainty component that measures an average uncertainty between the estimated pulse and the associated pulse.

12. The method of claim 11, wherein the digital receiver further uses the inter track temporal information to generate the score, said score further comprises a pulse order component that applies a selection logic to the estimated pulses for the tracks to rank the pulses and computes a scored based on said ranking.

13. The method of claim 1, wherein the digital receiver outputs the multiple tracks to a guidance module that designates one of the tracks as the primary track upon a final commit to the target object.

14. The method of claim 1, wherein the digital receiver maintains the multiple tracks after designation of the primary track to maintain the intra and inter track temporal information to associate pulses in subsequent PRI gates.

15. The method of claim 14, wherein the digital receiver reranks the tracks until a final commit to the target object.

16. A method of tracking multiple line-of-sight (LOS) objects in the field-of-view (FOV) of a digital semi-active laser receiver to track a target object illuminated by a laser designator at a pulse repetition interval (PRI), said digital receiver executing the steps of:
   receiving a temporal sequence of laser pulses reflected off objects in the FOV at a high gain for the digital receiver;
   processing the laser pulses to acquire multiple tracks;
   using inter and intra track temporal information to associate pulses in a next PRI gate to different tracks;
   using intra track temporal information to generate a score for each said track and using the inter track temporal information provided by the scores to rank the multiple tracks; and
   designating one said track as a primary track for tracking the target object and adjusting receiver gain based on said primary track while maintaining the tracks for other objects to maintain the intra and inter track temporal information to associate pulses in subsequent PRI frames.

17. The method of claim 16, wherein said score comprises a match quality component that measures an average shape fit of the pulses in the track to a specified shape, a track persistence component that measures the persistence of the track and a track uncertainty component that measures an average uncertainty between the estimated pulse and the associated pulse.

18. The method of claim 16, wherein the digital receiver outputs the multiple tracks to a guidance module that designates one of the tracks as the primary track upon a final commit to the target object.

19. A method of tracking multiple line-of-sight (LOS) objects in the field-of-view (FOV) of a digital semi-active laser receiver to track a target object illuminated by a laser designator at a pulse repetition interval (PRI), said digital receiver executing the steps of:
   receiving a temporal sequence of laser pulses reflected off objects in the FOV at a high gain for the digital receiver;
   correlating sub-sequences of the laser pulses to a PRI to acquire a track at or near the PRI;
   correlating sub-sequences of pulses that are not associated to one of the existing tracks to acquire new tracks at or near the PRI;
   using inter track temporal information to generate an estimate pulse for the next PRI gate for each said track; and
   using the inter track temporal information to associate pulses in the next PRI gate to different tracks based on a distance from the pulse to the estimated pulses;

designating one said track as a primary track for tracking the target object and adjusting receiver gain based on said primary track.

20. The method of claim 19, further comprising:

using the intra track temporal information to generate a score for each said track, said score comprises a match quality component that measures an average shape fit of the pulses in the track to a specified shape, a track persistence component that measures the persistence of the track and a track uncertainty component that measures an average uncertainty between the estimated pulse and the associated pulse;

using the inter track temporal information provided by the scores to rank the multiple tracks; and maintaining the multiple tracks after designation of the primary track to maintain the intra and inter track temporal information to associate pulses in subsequent PRI gates.

* * * * *